(12) United States Patent
Merchant et al.

(10) Patent No.: US 8,109,720 B2
(45) Date of Patent: Feb. 7, 2012

(54) EXHAUST PLENUM FOR A TURBINE ENGINE

(75) Inventors: Laxmikant Merchant, Karnataka (IN); Prabhakaran Saraswathi Rajesh, Trivandrum (IN)

(73) Assignee: General Electric Company, Schenectady, NY (US)

( * ) Notice: Subject to any disclaimer, the term of this patent is extended or adjusted under 35 U.S.C. 154(b) by 727 days.

(21) Appl. No.: 12/416,034

(22) Filed: Mar. 31, 2009

(65) Prior Publication Data
US 2010/0247304 A1    Sep. 30, 2010

(51) Int. Cl.
*F01D 25/24* (2006.01)
(52) U.S. Cl. .......................................... 415/207; 60/39.5
(58) Field of Classification Search .................. 415/207, 415/211.2, 119, 208.2; 60/39.5, 805
See application file for complete search history.

(56) References Cited

U.S. PATENT DOCUMENTS

| 2,840,342 | A | | 6/1958 | Silvern |
| 3,382,670 | A | | 5/1968 | Venable |
| 3,734,650 | A | * | 5/1973 | Reisacher et al. ............ 417/407 |
| 4,013,378 | A | | 3/1977 | Herzog |
| 4,326,832 | A | | 4/1982 | Ikeda et al. |
| 5,257,906 | A | | 11/1993 | Gray et al. |
| 5,301,500 | A | * | 4/1994 | Hines .............................. 60/792 |
| 5,603,605 | A | | 2/1997 | Fonda-Bonardi |
| 6,419,448 | B1 | | 7/2002 | Owczarek |
| 7,073,334 | B2 | * | 7/2006 | Sumser et al. .................. 60/602 |
| 2008/0022980 | A1 | * | 1/2008 | Melchior .................... 123/559.1 |
| 2010/0095940 | A1 | * | 4/2010 | Melchior .................... 123/559.1 |

* cited by examiner

*Primary Examiner* — Gary F. Paumen
(74) *Attorney, Agent, or Firm* — Fletcher Yoder

(57) ABSTRACT

An exhaust system for gas turbine engine is provided that reduces turbulence and backflow within the exhaust system and, thus, increases the efficiency of the turbine engine. In various embodiments, the system includes an exhaust plenum that provides a gradual expansion of the exhaust gases. The exhaust plenum may also include one or more flow splitters that further reduce turbulence in the plenum and provide a more uniform gas flow in the plenum and other downstream exhaust components.

20 Claims, 8 Drawing Sheets

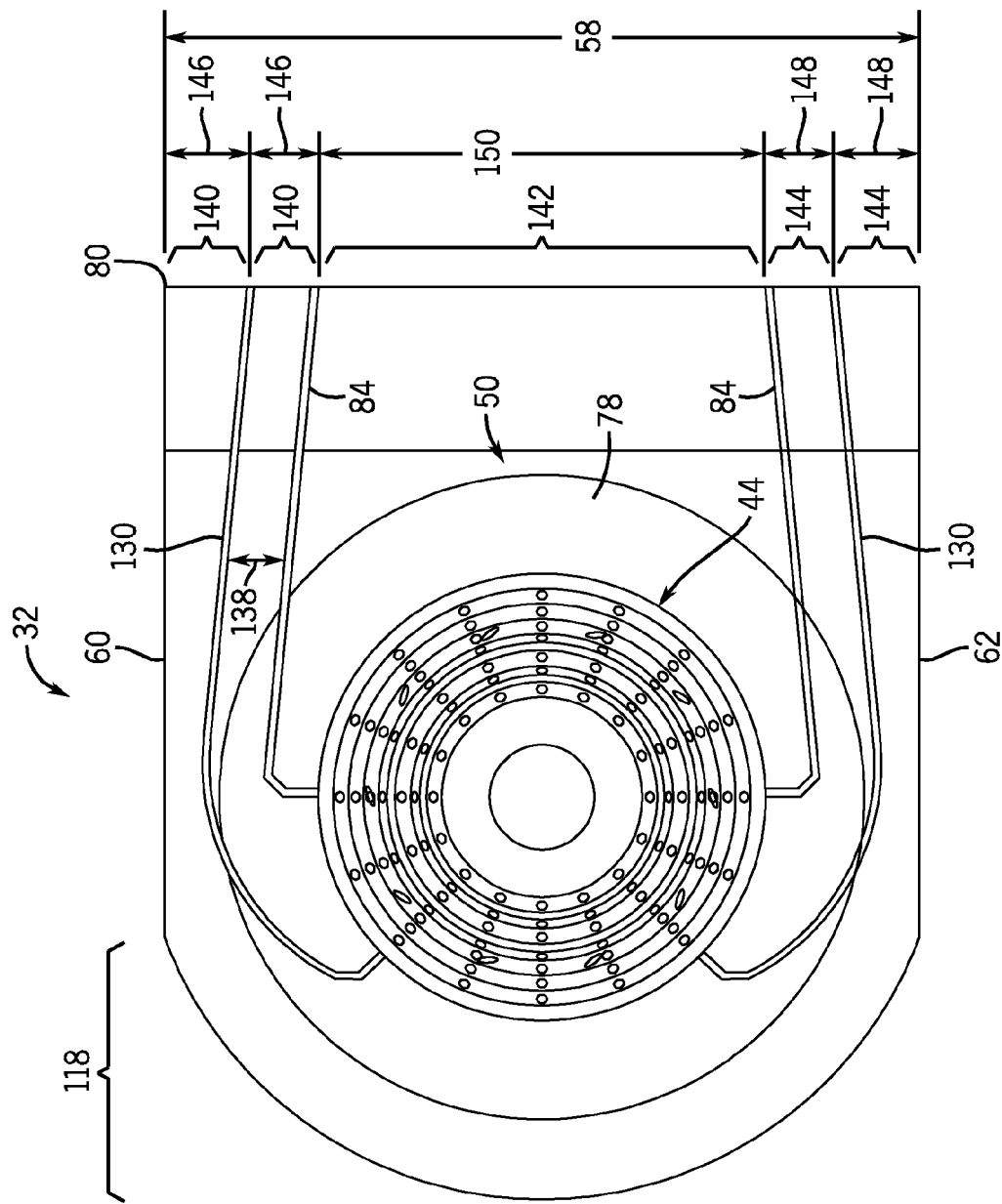
FIG. 8
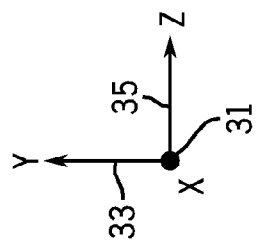

EXHAUST PLENUM FOR A TURBINE ENGINE

BACKGROUND OF THE INVENTION

The subject matter disclosed herein relates to gas turbine engines, and more specifically, to exhaust systems for gas turbine engines.

In general, gas turbine engines combust a mixture of compressed air and fuel to produce hot combustion gases. The combustion gases may flow through one or more stages of turbine blades to generate power for a load and/or a compressor. The gas turbine engine may exhaust the combustion gases into an exhaust system, which safely routes the combustion gases to the atmosphere. Unfortunately, the exhaust system generally creates backpressure to the gas turbine engine, which reduces performance of the gas turbine engine. Furthermore, efforts to make this exhaust system more compact have resulted in more complicated and expensive systems with a significant level of backpressure to the gas turbine engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a turbine engine comprising a radial diffuser disposed about a first axis downstream in an exhaust flow path from a turbine section and an exhaust plenum. The exhaust plenum may include an inlet, wherein the radial diffuser is disposed through the inlet into the exhaust plenum, and the exhaust plenum extends along a second axis crosswise relative to the first axis of the turbine engine. The exhaust plenum also includes a flow splitter extending completely across the exhaust plenum along the first axis, wherein the flow splitter extends in a first direction radially outward from the radial diffuser relative to the first axis, and the flow splitter bends from the first direction to a second direction downstream along the second axis. The exhaust plenum also includes a set of first and second aerodynamic surfaces facing one another about the radial diffuser, wherein the first and second aerodynamic surfaces are axially offset from one another by an axial offset along the first axis, and the first and second aerodynamic surfaces gradually expand the axial offset with increasing radial distance away from the first axis.

In another embodiment, a system includes a turbine exhaust plenum with an inlet coupled to a diffuser region configured to receive a radial diffuser of a turbine engine along a first axis, wherein the turbine exhaust plenum extends along a second axis crosswise relative to the first axis. The turbine exhaust plenum also includes a flow splitter extending completely across the turbine exhaust plenum along the first axis adjacent the diffuser region, wherein the flow splitter extends from an upstream end to a downstream end with a length of at least greater than a radius of the radial diffuser, and the flow splitter bends from the upstream end to the downstream end over an angle of at least approximately 90 degrees.

In another embodiment, a system includes a turbine exhaust plenum with an inlet coupled to a diffuser region configured to receive a radial diffuser of a turbine engine along a first axis, wherein the turbine exhaust plenum extends along a second axis crosswise relative to the first axis. The exhaust plenum also includes a set of first and second aerodynamic surfaces disposed opposite from one another relative to the diffuser region, wherein the first and second aerodynamic surfaces diverge away from one another in an outward radial direction away from the first axis.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 8 is a cut-away side view of an embodiment of the exhaust plenum, as shown in FIG. 1, with a symmetrical configuration having four flow splitters and a rounded back plate.

DETAILED DESCRIPTION OF THE INVENTION

Figure 1:
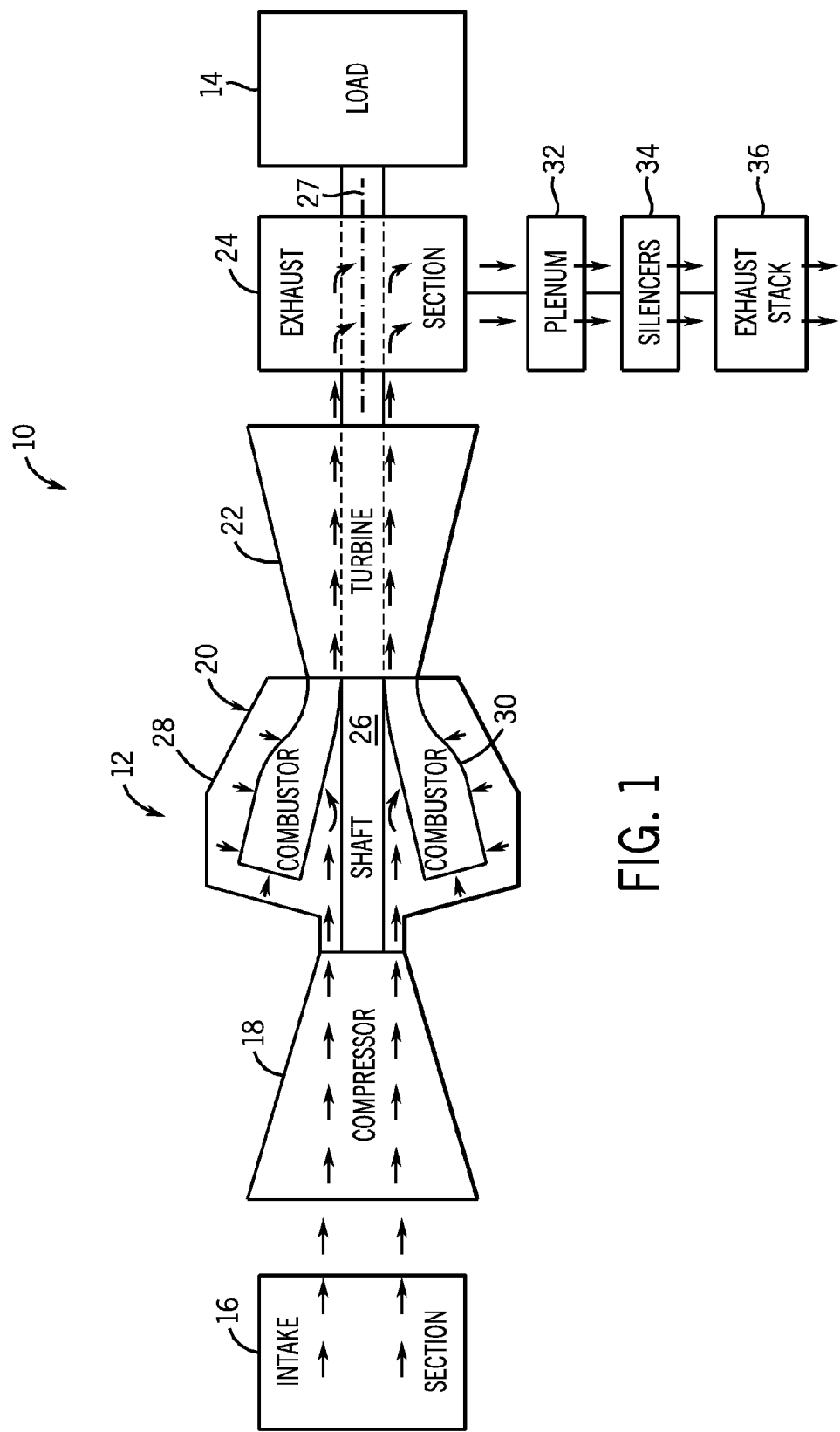
FIG. 1 is a schematic flow diagram of an embodiment of a gas turbine engine with an improved exhaust plenum.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to a gas turbine engine that includes an exhaust system that provides improved pressure recovery and reduced backpressure and, therefore, increases the efficiency of the turbine engine. In a gas turbine engine with a hot-end drive, a rotating shaft coupled to the turbine passes through the turbine at the exhaust end and is coupled to a generator or other load. Therefore, as the exhaust gases exit the turbine, the exhaust gases are guided through an exhaust duct that that extends outward away from the axis of the shaft to avoid the load (e.g., in a crosswise or radial direction). This change in the direction of exhaust flow (e.g., axial to radial) may tend to cause turbulence (e.g. swirling motion of the gases), which in turn causes significant backpressure. Additionally, as the combustion gases exit the turbine, the gases typically enter a high volume exhaust plenum that causes a sudden expansion of the gases, which also causes increased turbulence inside the plenum and produces non-uniform gas flow in the plenum and other downstream components.

Embodiments of the present invention provide an exhaust plenum that provides a gradual expansion of the exhaust gases within the plenum and thereby reduces the turbulence within the plenum. Additionally, embodiments may also include one or more flow splitters that further reduce turbulence in the plenum and produce a more uniform gas flow in the plenum and other downstream exhaust components. Further embodiments include a symmetrical exhaust plenum that reduces turbulence even further by producing an even more uniform gas flow within the plenum. The overall result is reduced backpressure and increased flow uniformity in the exhaust system. Furthermore, the exhaust plenum described herein is more compact than typical exhaust plenums, and uses less material, which reduces costs and space consumption at a facility.

FIG. 1 is a schematic flow diagram illustrating an embodiment of a gas turbine engine with an improved exhaust system. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is drivingly coupled to the compressor 18 via a shaft 26 oriented along a longitudinal axis 27 of the turbine engine 12. The shaft is drivingly coupled to a load 14, which may be positioned at the exhaust end of the turbine engine 12.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 axially between the compressor 18 and the turbine 22. The compressed air from the compressor 18 enters combustors 30 where the compressed air may mix and combust with fuel within the combustors 30 to drive the turbine 22.

From the combustor section 20, the hot combustion gases flow through the turbine 22, driving the compressor 18 and the load 14 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24. As the combustion gases pass from the exhaust section 24 to the exhaust plenum 32, the plenum 32 guides the combustion gases at an angle away from a longitudinal axis 27 of turbine engine 12 (e.g., approximately 90 degrees). In other words, the exhaust plenum 32 is oriented crosswise or transverse to the longitudinal axis 27, e.g., a radial direction. For example, the illustrated turbine engine 12 includes a radial duct or plenum 32 to route the combustion gases through a 90 degree turn relative to the longitudinal axis 27. The change in direction (e.g., 90 degree turn) tends to induce turbulence and increase the backpressure on the turbine, thus decreasing the efficiency of the turbine. As will be explained further below, the plenum 32 includes various improvements that reduce the turbulence and backpressure. For example, the plenum 32 may include one or more gradual expansion surfaces (e.g., opposite conical surfaces), flow splitters, and symmetrical arrangements to increase uniformity in the gas flow. After leaving the plenum 32, the combustion gases may pass through one or more silencers 34 that attenuate noise emitted by the turbine engine 12. From the silencers 34, the combustion gases then flow through an exhaust stack 36 to the outside environment.

Figure 2:
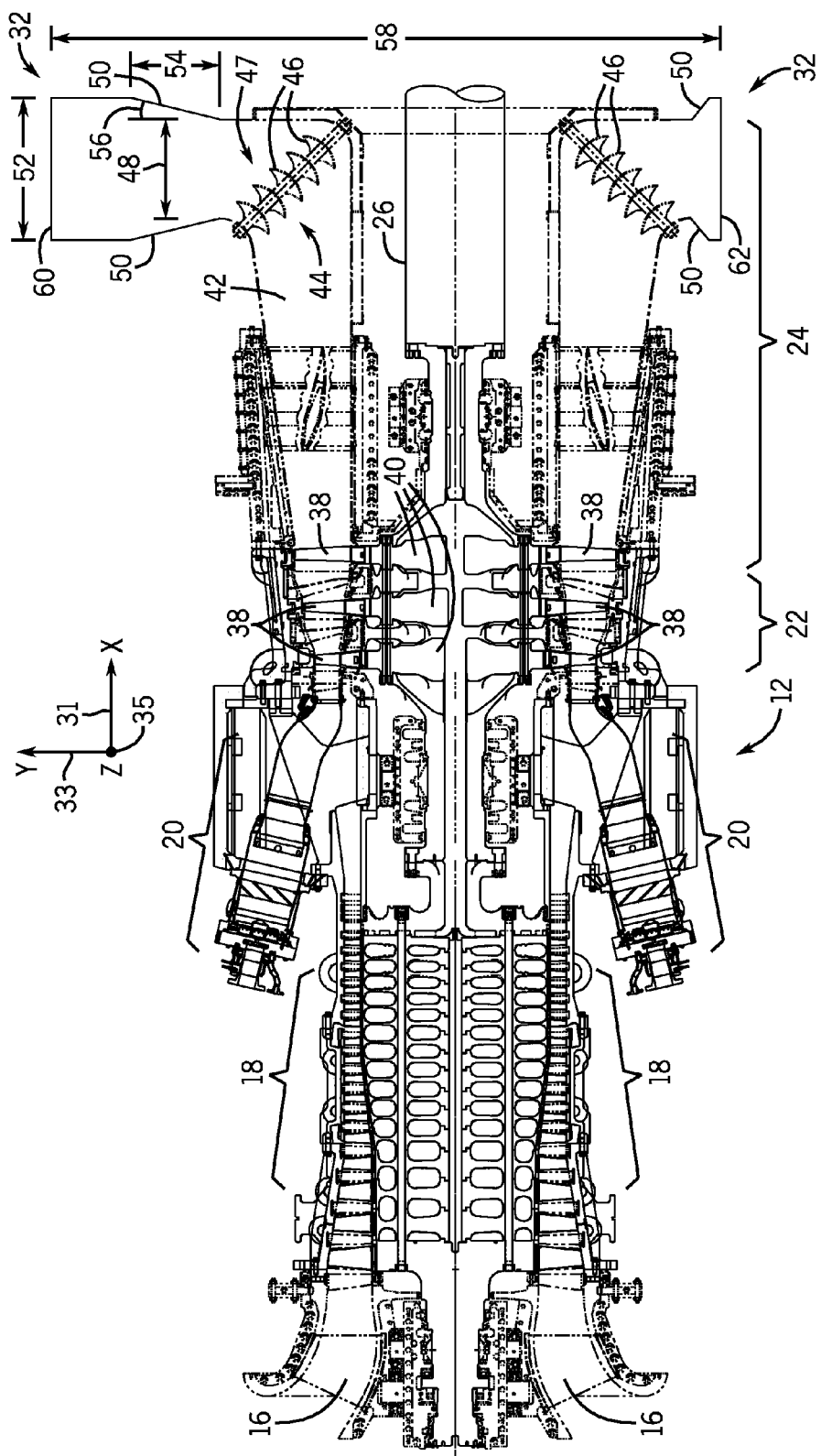
FIG. 2 is a sectional view of the gas turbine engine as shown in FIG. 1, illustrating an embodiment of the improved exhaust plenum.

FIG. 2 is a cross-sectional side view of the gas turbine engine 12 of FIG. 1, illustrating an embodiment of the improved exhaust plenum 32 of FIG. 1. To aid in the present description, orthogonal axes are defined which are consistent through the present specification. In some embodiments, these axes may be described as crosswise or transverse to one another, such that the angles between axes may not be limited to only 90 degrees. Specifically, the x-axis, indicated by arrow 31, is the central axis of the turbine engine 12; the y-axis, shown by arrow 33, is the vertical axis; and the z-axis, which points out of the page in the present view, points toward the general flow direction of the plenum 32 (See FIG. 3, arrow 35). As described above with respect to FIG. 1, air may enter through the air intake section 16 and be compressed by the compressor 18. The compressed air from the compressor 18 may then be directed into the combustor section 20 where the compressed air may be mixed with fuel (e.g., liquid and/or gas fuel). The mixture of compressed air and fuel is generally burned within the combustor section 20 to generate high-temperature, high-pressure combustion gases, which may be used to generate torque within the turbine 22. Specifically, the combustion gases may apply motive forces to buckets (e.g., turbine blades) of rotor assemblies 38 to turn wheels 40 and the shaft 26. As is more clearly shown in FIG. 2, the exhaust section 24 may include a radial diffuser 42 that guides the combustion gases annularly about the shaft 26 along the x-axis 31. The volume of the diffuser 42 gradually increases toward a diffuser output 44, thereby gradually reducing the pressure and airflow speed within the diffuser 42.

At the diffuser output 44, the combustion gases turn at approximately a 90 degree angle and flow into the plenum 32. To reduce turbulence in the diffuser 42, the diffuser output 44 may include several radial guide vanes 46 that guide the combustion gases through the 90 degree turn into the plenum 32 and improve the flow uniformity through the diffuser output 44. The diffuser 42 is disposed through an inlet 47 of the plenum 32, and the diffuser output 44 is fluidly coupled to the corresponding plenum inlet 47. As shown in FIG. 2, the initial width 48 of the plenum 32 at the plenum inlet 47 matches the width of the diffuser output 44. Therefore, the combustion gases do not experience a sudden expansion and drop in pressure upon entering the plenum 32, which is contrastingly different than other turbine exhaust systems.

After entering the plenum 32, the combustion gases are guided along aerodynamic surfaces, e.g., opposite sloping surfaces 50, inside the plenum 32. For example, the sloping surfaces 50 may be described as aerodynamic by virtue of their design with curvatures to reduce flow resistance, turbulence, and back pressure. These sloping surfaces 50 enable the combustion gases to gradually expand within the plenum 32, thus further inhibiting turbulent flow. In some embodiments, a slope angle 56 may be approximately 5 to 40 degrees, or 10 to 30 degrees, or 20 degrees. Additionally, the slope angle 56 may depend on the ratio of the initial width 48 of the plenum 32 to a full width 52 of the plenum 32 and the amount of space available inside the plenum 32. In some embodiments, full width 52 of the plenum 32 may be approximately 1.5 to 5 times or 2 to 3 times the initial width 48 of the plenum 32 and the length 54 of the slope may be approximately 20 to 30 inches. More specifically, the initial width 48 of the plenum 32 may be approximately 27 inches, the full width 52 of the plenum 32 may be approximately 70 inches, and the length 54 of the slope may be approximately 25 inches. In alternate embodiments, the full plenum width 52 may be approximately the same as the initial plenum width 48 and the slope angle 56 may be approximately zero degrees. The height 58 of the plenum 32 may be approximately 5 to 15 times or 7 to 9 times the initial width 48 of the plenum 32. More specifically, the height 58 of the plenum may be approximately 205 inches.

As shown in FIG. 2, the diffuser output 44 is not positioned centrally within the plenum 32. Therefore, the flow characteristics will be different near the bottom 62 of the plenum 32 compared to the top 60 of the plenum 32. In other embodiments, which will be described further below with reference to FIG. 8, the diffuser output 44 may be centrally located inside the plenum 32 such that the flow characteristics are the same at the top and the bottom of the plenum 32, thereby further increasing the flow uniformity in the plenum 32 and other exhaust components further downstream.

Figure 3:
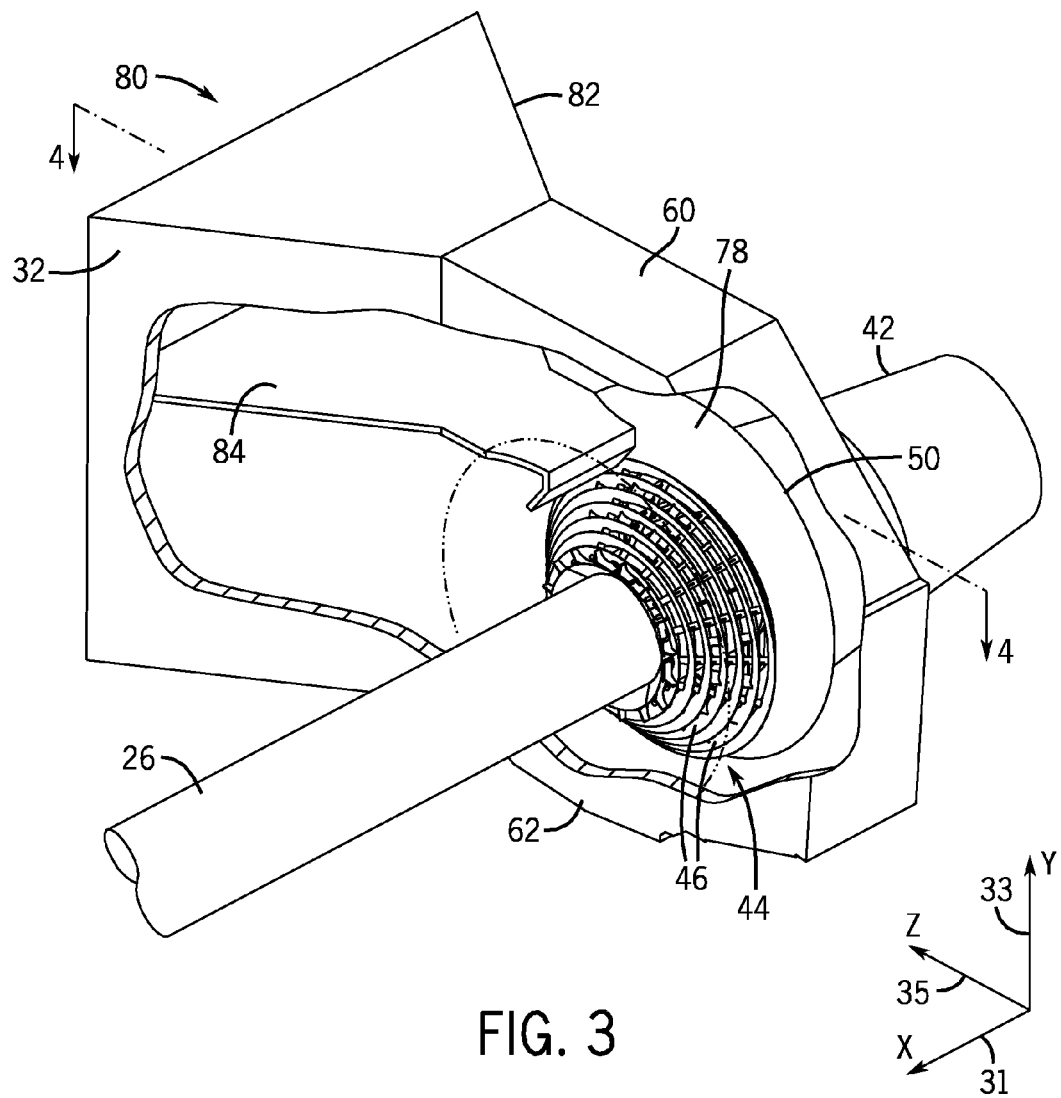
FIG. 3 is a cut-away perspective view of an embodiment of the exhaust plenum, as shown in FIG. 1, with conical surfaces and a flow guide.

FIG. 3 is a cut-away perspective view of an embodiment of the plenum 32 shown in FIG. 2. As described above in reference to FIG. 2, the diffuser 42 guides the combustion gases into the plenum 32 through the radial guide vanes 46. As is more clearly shown in FIG. 3, the radial guide vanes 46 may be circular (e.g., tapered annular or conical structures) and disposed concentrically about the x-axis 31. Accordingly, the combustion gases may exit the diffuser 42 radially outward and away from the axis of the shaft 26, i.e. the x-axis 31, about the circumference of the annular diffuser output 44. As is also more clearly shown in FIG. 3, the sloping surfaces 50 may be tapered annular surfaces formed by one or more cones 78 centered approximately about the diffuser output 44. The sloping surfaces 50 gradually broaden the width of the air flow path as the combustion gases travel away from the x-axis 31. In some embodiments, the sloping surfaces 50 may be shaped differently within different areas of the plenum 32, according, in part, to the space available within different areas of the plenum 32. For example, as shown in FIGS. 2 and 3, the bottom 62 of the plenum 32 may be closer to the diffuser output 44. Therefore, the sloping surfaces 50 may be sloped more rapidly toward the bottom of the plenum 32. Furthermore, in some embodiments, as will be more clearly shown in FIG. 4, the sloping surfaces 50 may be formed by two cones 78 positioned across from each other on opposite sides of the plenum 32.

After the combustion gases enter the plenum 32, the plenum 32 then gradually guides the combustion gases toward the same direction along the z-axis 35, where they eventually exit the plenum 32 at the plenum output plane 80. The plenum 32 may also include a tapered output transition 82 that gradually expands the width of the plenum 32 to match the width of the next downstream exhaust component. Also included in the plenum 32 is a flow splitter 84 that guides the combustion gases from the diffuser output 44 to the plenum output 80. As discussed below, the flow splitter 84 is configured to reduce recirculation zones, reduce the concentration of flow along the walls, and increase the uniformity of the flow in the forward direction through the 32. As shown in FIG. 3, the flow splitter 84 spans the width of the plenum 32, extending completely across the plenum 32 along the x-axis 31. Accordingly, the flow splitter 84 is tapered to match the contour of the sloping surfaces 50 and the output transition 82.

The flow splitter 84 provides a number of advantages. For example, the flow splitter 84 may inhibit swirling flow and recirculation zones inside the plenum 32. For another example, the flow splitter 84 may also guide a portion of the combustion gases away from the top 60 of the plenum 32 and toward the middle of the plenum 32, thereby increasing the uniformity of flow out of the plenum 32 and reducing high pressure regions along the plenum wall. In other words, the flow splitter 84 reduces the concentration or attachment of the flow along the walls of the plenum 32 by redirecting at least some portion of the flow toward a more central region within the plenum 32. The flow splitter 84 also aids in directing the flow in a forward or downstream direction (i.e., mostly forward velocity vectors) along the z-axis 35 through the plenum 32, rather than allowing the flow to vary in direction throughout the plenum 32. Each of theses advantages may serve to reduce the backpressure on the turbine engine 12. In certain embodiments, the sloping surfaces 50 and the flow splitter 84 may be configured to provide a minimum variation in mass distribution across the plenum 32 (e.g., across the cross-section transverse to the flow direction along the z-axis 35) relative to an average value across the plenum 32. Again, the sloping surfaces 50 and the flow splitter 84 may be configured to improve the aerodynamics by reducing flow resistance, reducing turbulence, reducing recirculation zones, improving the distribution or uniformity of flow, and reducing back pressure. As will be described below, the plenum 32 may, in some embodiments, include several flow splitters 84. Other details of the tapered output transition 82 and the flow splitter (s) 84 may be better described with reference to FIGS. 4 and 5.

Figure 4:
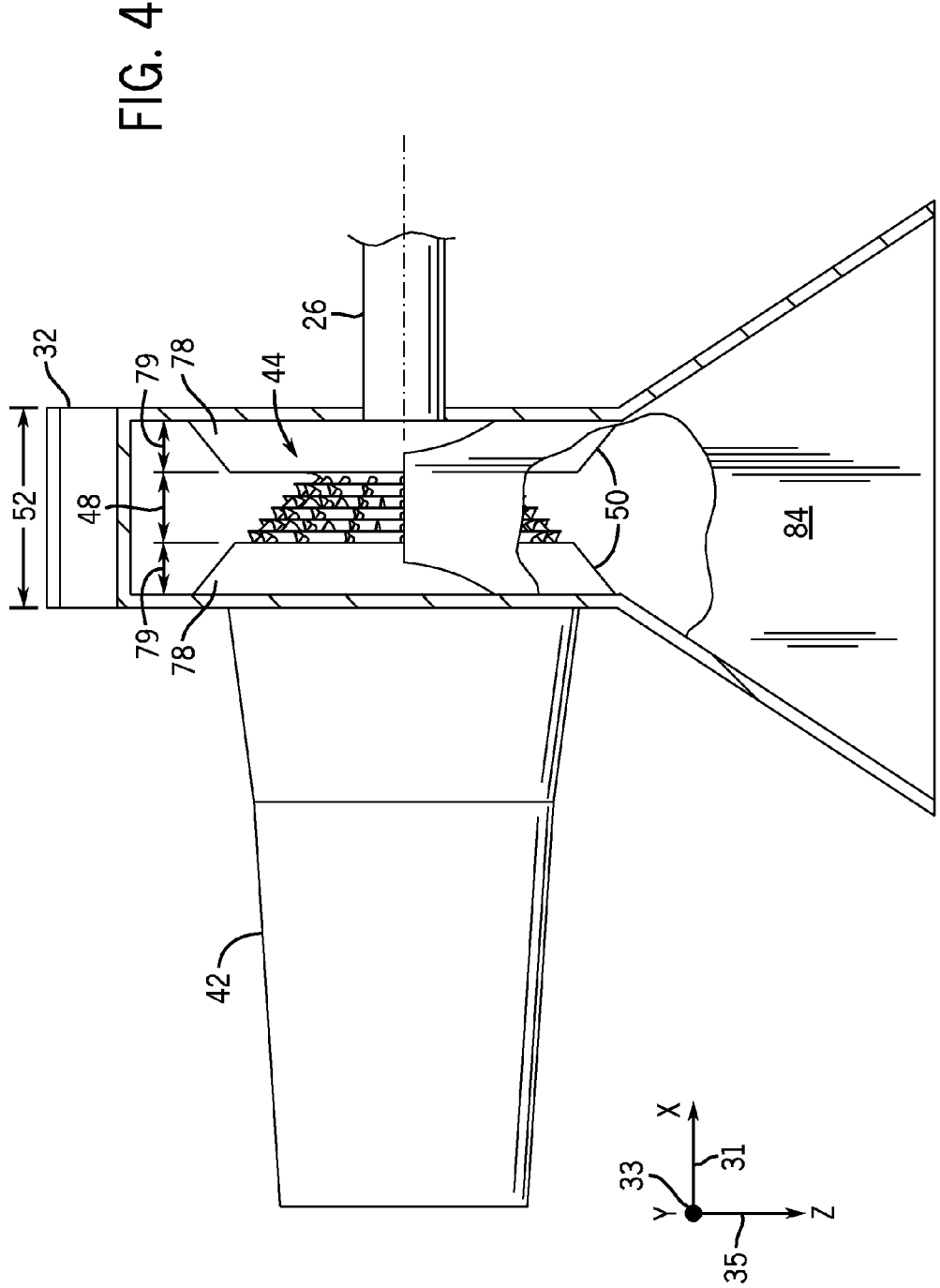
FIG. 4 is a cut-away top view of the exhaust plenum of FIG. 3.

FIG. 4 is a cut-away top view of an embodiment of the plenum 32 as shown in FIG. 3. Additionally, a portion of the flow splitter 84 is cut-away to show the sloping surfaces 50 on both sides of the plenum 32. As can be more clearly seen in FIG. 4, the sloping surfaces 50 may be formed by two cones 78 positioned across from each other on opposite sides of the plenum 32 sidewalls with an axial offset along the x-axis 31 that forms the initial width 48 of the plenum 32. As illustrated, the cones 78 diverge away from one another with radial distance from the x-axis 31. The axial offset between the sloping surfaces expands at greater radial distances from the x-axis 31 out to the full width 52 of the plenum 32, as describe above in relation to FIG. 2. As stated above in relation to FIG. 2, the slope angle 56 of the sloping surfaces 50 formed by the cones 78 may range between approximately 0 to 60 degrees or 5 to 45 degrees, or any specific angle in between. In one embodiment, the slope angle 56 may range between approximately 10 to 30 degrees. Accordingly, the rate at which the sloping surfaces 50 diverge away from one another may be approximately 35 to 115 percent of a change in axial offset versus a change in radial distance. It should also be noted that, as viewed from the top as in FIG. 4, the geometry of the cones 78 may be substantially the same on both sides of the x-axis 32, i.e. the cones 78 may be symmetrical about the x-y plane. Therefore, the slope on opposite sides of the x-y plane may be substantially the same. It can also be more clearly seen in FIG. 4 that the flow splitter 84 extends across the full width of the plenum 32, adhering to the contours of the cones 78 and the tapered output transition 84. Furthermore, it can also be seen that the diffuser output 44 may be centered within the plenum 32 in the x-axis 31 direction and that the height 79 of both cones 78 may be approximately the same.

Figure 5:
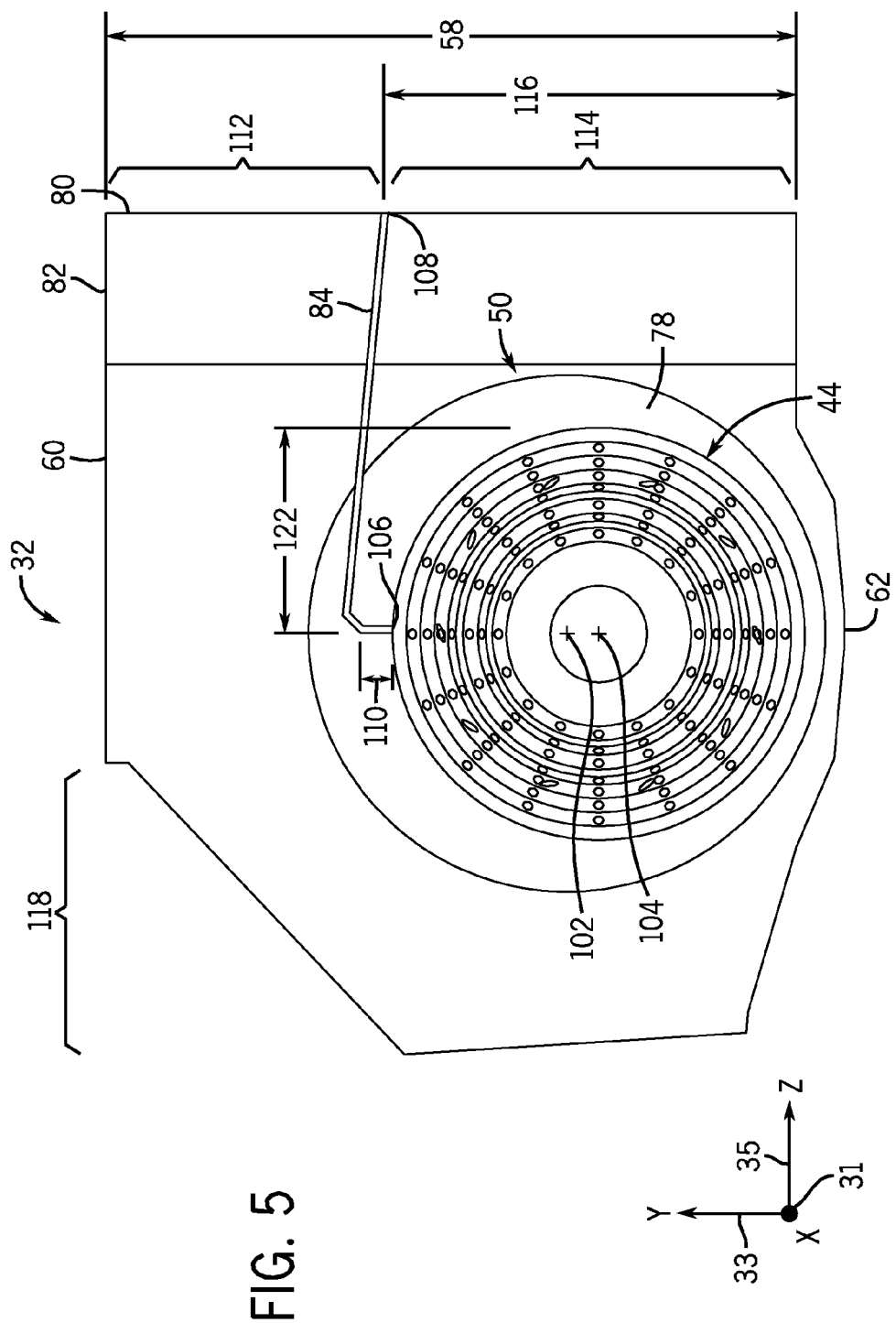
FIG. 5 is a cut-away side view of the exhaust plenum of FIG. 3.

FIG. 5 is a cut-away side view of an embodiment of the plenum 32 shown in FIGS. 1-4. As is shown in FIG. 5, the back side 118 of the plenum 32 may be shaped to more closely conform to the circular contour of the diffuser output 44. This may serve to inhibit low pressure pockets that may otherwise form at corners of the plenum 32, thereby reducing turbulence and backpressure. As shown in FIG. 5, the backside 118 of the plenum 32 may be defined by segments, e.g. formed by flat plates 120, which are configured to roughly approximate a rounded surface. Segmenting the backside 118 of the plenum 32 with flat plates 120 may reduce the expense of fabricating the plenum 32 with a curved surface. In other embodiments, the back side 118 of the plenum 32 may be square, which may make the flow splitter 84 easier and less expensive to fabricate. However, certain embodiments of the plenum 32 may have a curved backside 118, e.g., semi-circular shape, which may further reduce the turbulence and backpressure.

Additionally, as shown in FIG. 5, the diffuser output 44 may be positioned in the turbine exhaust plenum at an off-center position relative to the x-axis 31. In other words, the diffuser output 44 may be closer to the bottom 62 of the plenum 32 than the top 60 of the plenum 32. Furthermore, the flow splitter 84 may be disposed toward the top 60 of the plenum 32 in relation to the diffuser output 44. It can also be seen in FIG. 5 that the diffuser output 44 and the cones 78 may not be concentric. For example, a center 102 of the cone 78 may be shifted along the y-axis 33 approximately 6 to 12 inches above a center 104 of the diffuser output 44. In certain embodiments, the offset between centers 102 and 104 may be at least greater than approximately 2.5 5, 7.5, 10, 15, 20, or 25 percent of the diameter of the diffuser output 44. In some embodiments, the offset between centers 102 and 104 may depend on the amount of offset of the diffuser output 44 in the plenum 32.

Also shown in FIG. 5, is an exemplary flow splitter 84, which spans from the diffuser output 44 to the plenum output 80. For purposes of the specifying particular angles about the diffuser output 44, the z-axis 35 is herein defined as pointing toward 0 degrees, while the y-axis 33 is herein defined as pointing toward 90 degrees. Additionally, an upstream or "leading" edge 106 of the flow splitter 84 will be considered the edge closest to the diffuser output 44, and a downstream or "trailing" edge 108 of the flow splitter 84 will be considered to be the edge closer to the plenum output plane 80.

Accordingly, as shown in FIG. 5, the leading edge 106 of the flow splitter 84 may be positioned at approximately 90 degrees. Furthermore, the leading edge 106 of the flow splitter 84 may begin at the narrowest point between the two sloped surfaces 50, e.g. at the place where the cones 78 meet the diffuser output 44. The flow splitter 84 may then extend radially outward for a short distance 110 of approximately 6 to 12 inches before bending toward the plenum output 80. In some embodiments, the flow splitter bends at least approximately 90 degrees from the radial, i.e., y-axis 33, direction to the downstream, i.e., z-axis 35, direction. In some embodiments, the flow splitter 84 may curve gradually from the diffuser output 44 to the plenum output 80 to further inhibit turbulent flow. However, in some embodiments, the flow splitter 84 may be segmented, as shown in FIG. 5, which may make the flow splitter 84 easier and less expensive to fabricate while still maintaining significantly low turbulence. In other words, the flow splitter 84 may include a plurality of flat plates in series to define the desired turn from the leading edge 106 to the trailing edge 108. Furthermore, in some embodiments, the flow splitter 84 may complete or substantially complete the turn (e.g., approximately 90 degrees) within the confines of the cones 78. In other embodiments, the flow splitter 84 may complete a portion (e.g., 50 percent) of the turn within the confines of the cones 78, while finishing the turn beyond the cones 78.

The flow splitter 84 extends generally downstream in the z-axis 35 direction to an axial offset position away from the radial diffuser. The total length of the flow splitter 84 may generally be greater than the radius 122 of the diffuser output 44. Furthermore, in certain embodiments, a percentage of the radial length (e.g., distance 110) versus the axial length (e.g., beyond 110) may be at least less than approximately 5, 10, 15, 20, 25, 30, or 35 percent. In some embodiments, the trailing edge 108 of the flow splitter 84 may be substantially flush with the plenum output 80 and may bisect the plenum output 80 into a top section 112 and a bottom section 114. In some embodiments, the height 116 of the bottom section 114 may be approximately 50 to 60 percent of the overall height 58 of the plenum 32. Furthermore, the relative height of the top section 112 and the bottom section 114 may be chosen, in some embodiments, to provide substantially equal air-flow velocity at the plenum output 80 in both the top section 112 and the bottom section 114. The functioning of the flow guide 84 may be better understood with reference to FIG. 6

Figure 6:
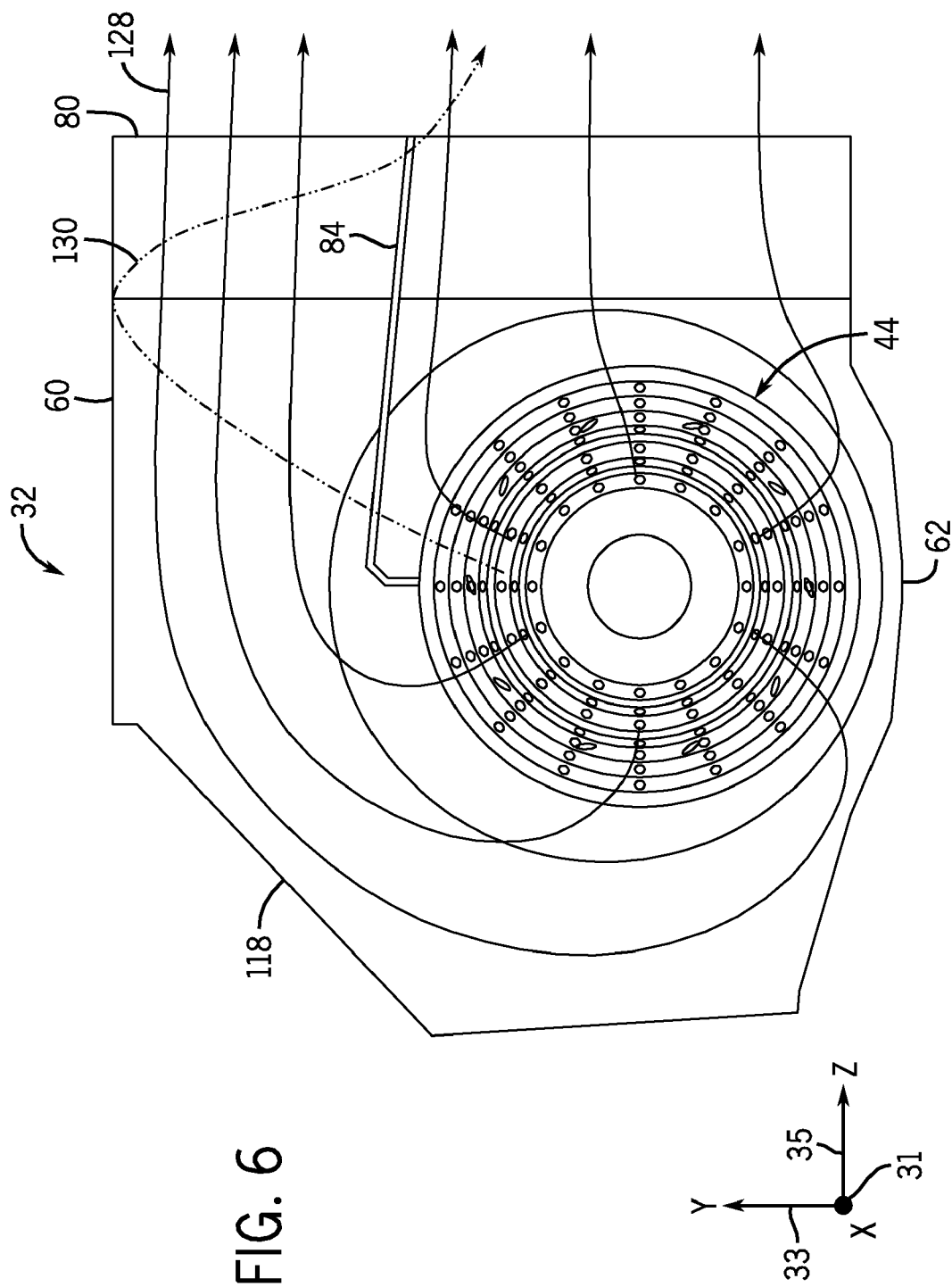
FIG. 6 is a cut-away side view of the exhaust plenum of FIG. 3, illustrating air flow in the plenum, in accordance with embodiments.

FIG. 6 is a cut-away side view of the plenum 32 of FIG. 5, illustrating an example of the air flow in an embodiment of the plenum 32. When the exhaust gases exit from the diffuser output 44, the direction of flow may be substantially radial, i.e. away from the x-axis 31, as illustrated by the solid lines 128. Shortly after exiting the diffuser output 44, some of the combustion gases may begin to take on a circumferential flow, depending on which side of the diffuser output 44 that the combustion gases exit from. The combustion gases exiting toward the plenum output 80 may tend to travel substantially linearly from the diffuser output 44 directly to the plenum output 80. Meanwhile, gases exiting toward the backside 118 of the plenum 32, opposite the plenum output 80, will travel circumferentially around the diffuser output 44 toward the plenum output 80.

Without the flow splitter 84, more of the combustion gases exiting the diffuser output 44 may tend to be directed toward the top 60 of the plenum 32, as indicated by the dotted line 130, resulting in increased air pressure at the top 60 of the plenum 32, reduced air pressure toward the center of the plenum 32, and a more turbulent air flow that may extend through other downstream exhaust components. With the flow splitter 84, more of the combustion gases are directed more immediately toward the center of the plenum 32, resulting in more uniform flow characteristics from the top 60 to the bottom 62 of the plenum 32 and reduced turbulence. Furthermore, the increased flow uniformity may also extend to other downstream exhaust components such as the silencers 34 (FIG. 1). The net result may be a drop in backpressure, which increases the efficiency of the turbine engine 12.

Figure 7:
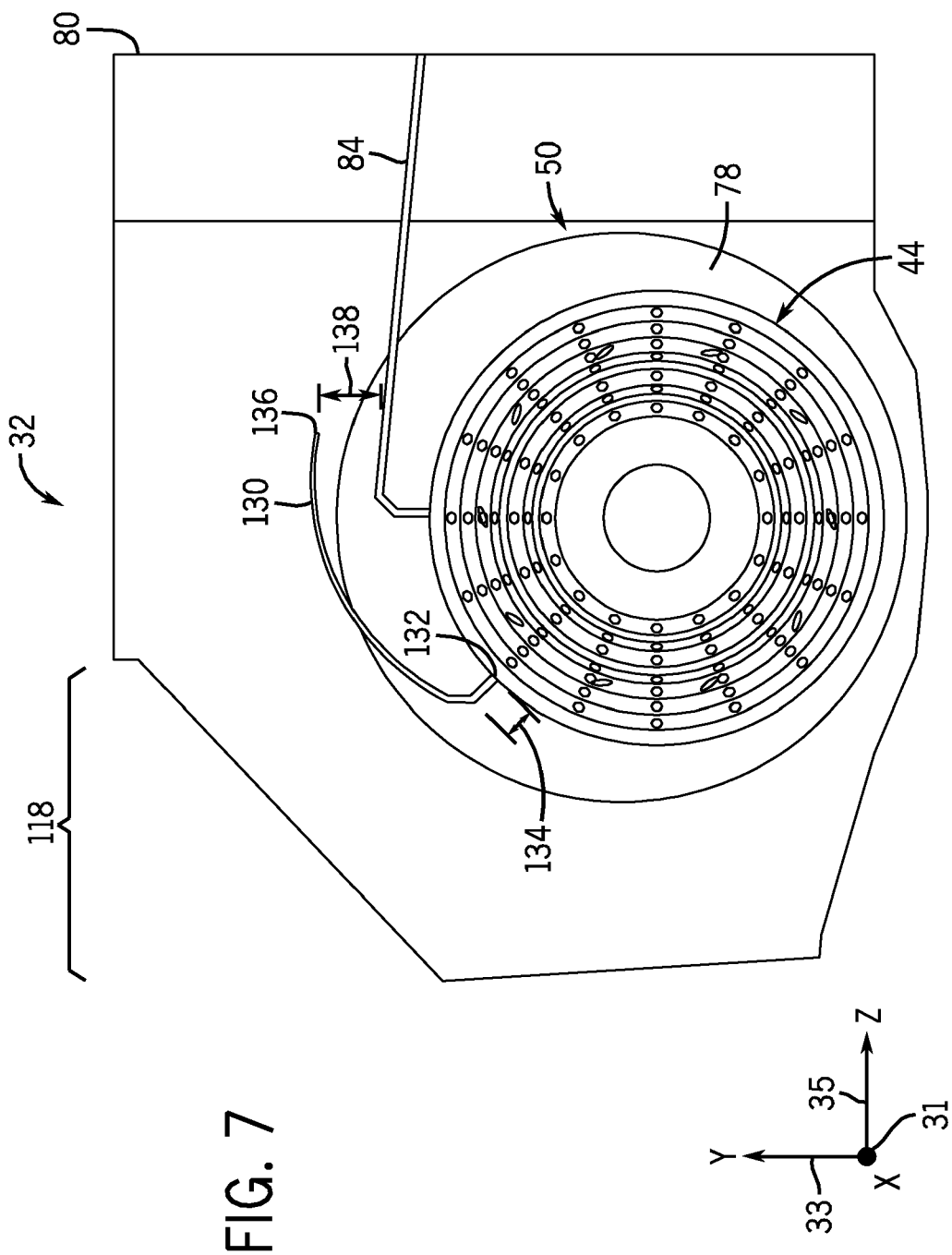
FIG. 7 is a cut-away side view of an embodiment of the exhaust plenum, as shown in FIG. 1, with two flow splitters.

FIGS. 7 and 8 are cut-away side views of additional embodiments of the plenum 32 which may provide even further reduced backpressure. Turning first to FIG. 7, a plenum 32 with two flow splitters is shown. As with the first flow splitter 84, the second flow splitter 130 also serves to guide the combustion gases toward the plenum output 80 and reduce turbulence. The second flow splitter 130, however, provides additional flow guidance for combustion gases exiting more toward the back side of the plenum 32. Accordingly, a leading edge 132 of the second flow splitter 130 may begin at approximately 90 to 180 degrees, 110 to 160 degrees, or approximately 135 to 150 degrees, or any specific angle in between. In the illustrated embodiment, the leading edge 132 is located at approximately 135 degrees. Additionally, as with the first flow splitter 84, the leading edge 132 of the second flow splitter 130 may be positioned at the narrowest point between the two sloped surfaces 50 (e.g., cones 78). The second flow splitter 130 may then extend radially outward for a short distance 134 of approximately 6 to 12 inches before bending toward the plenum output 80. In some embodiments, the second flow splitter 130 may curve gradually from the diffuser output 44 to the plenum output 80 as shown in FIG. 7. In this way turbulent flow toward the backside 118 of the plenum 32 may be further inhibited.

The trailing edge 136 of the second flow splitter 130 may be located at approximately the 60 to 90 degree position. In other embodiments, which will be shown in FIG. 8, the trailing edge 136 of the second flow splitter 130 may be flush with the plenum output 80 and may section the plenum output 80 into three sections. However, the flow splitter 130 may have any suitable circumferential length or angular span from the leading edge 132 to the trailing edge 136. For example, the flow splitter 130 may have a circumferential length of approximately 90, 100, 110, 120, 130, 140, 150, 160, 170, or 180 degrees. A gap 138 between the first flow splitter 84 and the second flow splitter 130 may be maintained at approximately 0.5 to 1.0 times the initial width 48 of the plenum (see FIG. 2). In some embodiments, the gap 138 may be approximately 12 to 28 inches. Furthermore, the gap 138 may be selected to provide equal air flow velocity on both sides of the second flow splitter 130 at the trailing edge 136 of the second flow splitter 130.

Turning now to FIG. 8, a symmetrical plenum 32 is shown. As shown in FIG. 8, the plenum 32 is symmetrical about the Z-axis 35. For example, the top side 60 and the bottom side 62 are equally spaced (and thus symmetrical) about the cones 78 and the diffuser output 44. Likewise, the flow splitters 84 and 130 are equally spaced (and thus symmetrical) between the top and bottom sides 60 and 62 and the diffuser output 44. Furthermore, as discussed above, the second flow splitters 130 may extend to the plenum output plane 80 while maintaining the gap 138 as described above. As such, the plenum output 80 may be divided into five sections, two top sections 140, a middle section 142, and two bottom sections 144. In some embodiments, the flow splitters 84 and 130 may be positioned such that the relative height of each of the five sections 140, 142, and 144 may be approximately proportional to the relative air flow through each section, thus providing approximately equal air flow velocity through each of the sections 140, 142, and 144 at the plenum output plane 80. In certain embodiments, the height 146 of the two top sections 140 may be approximately 12.5 percent of the overall height 58 of the plenum 32 and may each provide approximately 12.5 percent of the air flow exiting the plenum 32. Additionally, the height 148 of the two bottom sections 144 may be approximately 12.5 percent of the overall height 58 of the plenum 32 and may each also provide approximately 12.5 percent of the air flow exiting the plenum 32. Accordingly, the height 150 of the middle section 142 may be approximately half of the overall height 58 of the plenum 32 and may provide approximately half of the air flow exiting the plenum 32.

As is also shown in FIG. 8, the backside 118 of the plenum 32 may be rounded to more closely conform to the circular contour of the diffuser output 44. This may serve to inhibit low pressure pockets that may otherwise form at corners of the plenum 32, thereby reducing turbulence and backpressure. The result is a substantially more uniform, laminar flow with less turbulence and backpressure.

The exhaust system disclosed herein use a variety of techniques that reduce backpressure and thereby enable increased efficiency for gas turbine engines. For example, embodiments disclosed herein provide gradual expansion of combustion gases within the plenum 32 along a gradually sloping surface. For another example, embodiments disclosed herein provide flow splitters 84 and 130 that guide the combustion gases away from the walls of the plenum 32 and toward the center of the plenum 32, thus making the flow within the plenum 32 more uniform and reducing air friction between the combustion gases and the walls of the plenum 32. In certain embodiments, the plenum 32 may include any number and configuration of flow splitters, e.g., 1, 2, 3, 4, 5, 6, 7, 8, 9, 10, or more flow splitters on one or both sides 60 and 62 of the diffuser output 44. For example, the flow splitters may be disposed at increments of 5, 10, 15, 20, 25, 30, 35, 40, 45, 50, 55, 60, or 90 degrees about the circumference of the diffuser output 44. As a result, depending on the location of the leading edge along the circumference of the diffuser output 44, the flow splitter may have a greater or lesser turn angle. Furthermore, the improved flow characteristics may also extend to exhaust components further downstream. Furthermore, the flow characteristics may be further improved by making the exhaust plenum symmetrical and/or making the back side of the plenum 32 rounded. Employing one or more of the disclosed improvements in various combinations may result in less turbulent air flow, increased flow uniformity, and reduced backpressure in the plenum and other parts of the exhaust system. Furthermore, the exhaust system described herein may be more compact and use less material compared to typical exhaust plenums, which may save both space and money.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
 a turbine engine comprising a radial diffuser disposed about a first axis downstream in an exhaust flow path from a turbine section; and
 an exhaust plenum, comprising:
  an inlet, wherein the radial diffuser is disposed through the inlet into the exhaust plenum, and the exhaust plenum extends along a second axis crosswise relative to the first axis of the turbine engine;
  a flow splitter extending completely across the exhaust plenum along the first axis, wherein the flow splitter extends in a first direction radially outward from the radial diffuser relative to the first axis, and the flow splitter bends from the first direction to a second direction downstream along the second axis; and
  a set of first and second aerodynamic surfaces facing one another about the radial diffuser, wherein the first and second aerodynamic surfaces are axially offset from one another by an axial offset along the first axis, and the first and second aerodynamic surfaces gradually expand the axial offset with increasing radial distance away from the first axis.

2. The system of claim 1, wherein the radial diffuser comprises a plurality of circular vanes disposed about the first axis, and the flow splitter extends in the first direction radially outward from the vanes.

3. The system of claim 1, wherein the flow splitter bends at least approximately 90 degrees from the first direction to the second direction.

4. The system of claim 1, wherein the flow splitter extends in the first direction at an angle of approximately 90 degrees relative to the second axis.

5. The system of claim 1, wherein the flow splitter extends downstream along the second axis to an axial offset away from the radial diffuser.

6. The system of claim 1, wherein the flow splitter extends from the first direction to the second direction with a length of at least greater than a radius of the radial diffuser.

7. The system of claim 1, comprising another flow splitter extending completely across the exhaust plenum along the first axis, wherein the other flow splitter extends in a third direction radially outward from the radial diffuser relative to the first axis, the other flow splitter bends from the third direction to a fourth direction downstream along the second axis.

8. The system of claim 1, wherein the first and second aerodynamic surfaces comprise conical surfaces diverging away from one another in an outward radial direction away from the first axis.

9. The system of claim 1, wherein the first and second aerodynamic surfaces comprise diverging surfaces that diverge away from one another in an outward radial direction away from the first axis at a rate of less than about 115 percent of a change in axial offset versus a change in radial distance.

10. A system, comprising:
a turbine exhaust plenum, comprising:
an inlet coupled to a diffuser region configured to receive a radial diffuser of a turbine engine along a first axis, wherein the turbine exhaust plenum extends along a second axis crosswise relative to the first axis; and
a flow splitter extending completely across the turbine exhaust plenum along the first axis adjacent the diffuser region, wherein the flow splitter extends from an upstream end to a downstream end with a length of at least greater than a radius of the radial diffuser, and the flow splitter bends from the upstream end to the downstream end over an angle of at least approximately 90 degrees.

11. The system of claim 10, wherein the flow splitter is configured to split and route exhaust flow to provide a substantially uniform flow distribution.

12. The system of claim 10, wherein the diffuser region is positioned in the turbine exhaust plenum at an off-center position relative to the first axis, and wherein the diffuser region is closer to a first side and farther from a second side opposite from the first side about the first axis, and the flow splitter is disposed on the second side.

13. The system of claim 10, wherein the flow splitter comprises first and second flow splitters disposed on opposite first and second sides of the diffuser region about the first axis, each of the first and second flow splitters has the length of at least greater than the radius of the radial diffuser, and each of the first and second flow splitters bends from the upstream end to the downstream end over the angle of at least approximately 90 degrees.

14. The system of claim 10, wherein the diffuser region is centered within the turbine exhaust plenum relative to a width of the turbine exhaust plenum along the first axis, and the diffuser region is centered within the turbine exhaust plenum relative to a height of the turbine exhaust plenum along a third axis crosswise to both the first and second axes.

15. The system of claim 10, comprising a second flow splitter extending completely across the turbine exhaust plenum along the first axis adjacent the diffuser region, wherein the second flow splitter extends from an second upstream end to a second downstream end, and the first downstream end and the second downstream end lie in a plane orthogonal to the second axis.

16. The system of claim 10, comprising aerodynamic surfaces positioned about the first axis and surrounding the inlet, wherein the aerodynamic surfaces provide an initial plenum width at the inlet and gradually slope outward to a full plenum width at a location radially away from the inlet relative to the first axis.

17. A system, comprising:
a turbine exhaust plenum, comprising:
an inlet coupled to a diffuser region configured to receive a radial diffuser of a turbine engine along a first axis, wherein the turbine exhaust plenum extends along a second axis crosswise relative to the first axis; and
a set of first and second aerodynamic surfaces disposed opposite from one another relative to the diffuser region, wherein the first and second aerodynamic surfaces diverge away from one another in an outward radial direction away from the first axis.

18. The system of claim 17, wherein the first and second aerodynamic surfaces comprise conical surfaces diverging away from one another in the outward radial direction away from the first axis.

19. The system of claim 18, wherein the conical surfaces are axially offset from one another by an axial offset along the first axis.

20. The system of claim 19, wherein the conical surfaces diverge away from one another in the outward radial direction away from the first axis at a rate of less than about 115 percent of a change in the axial offset versus a change in radial distance.

* * * * *